Figure 1:
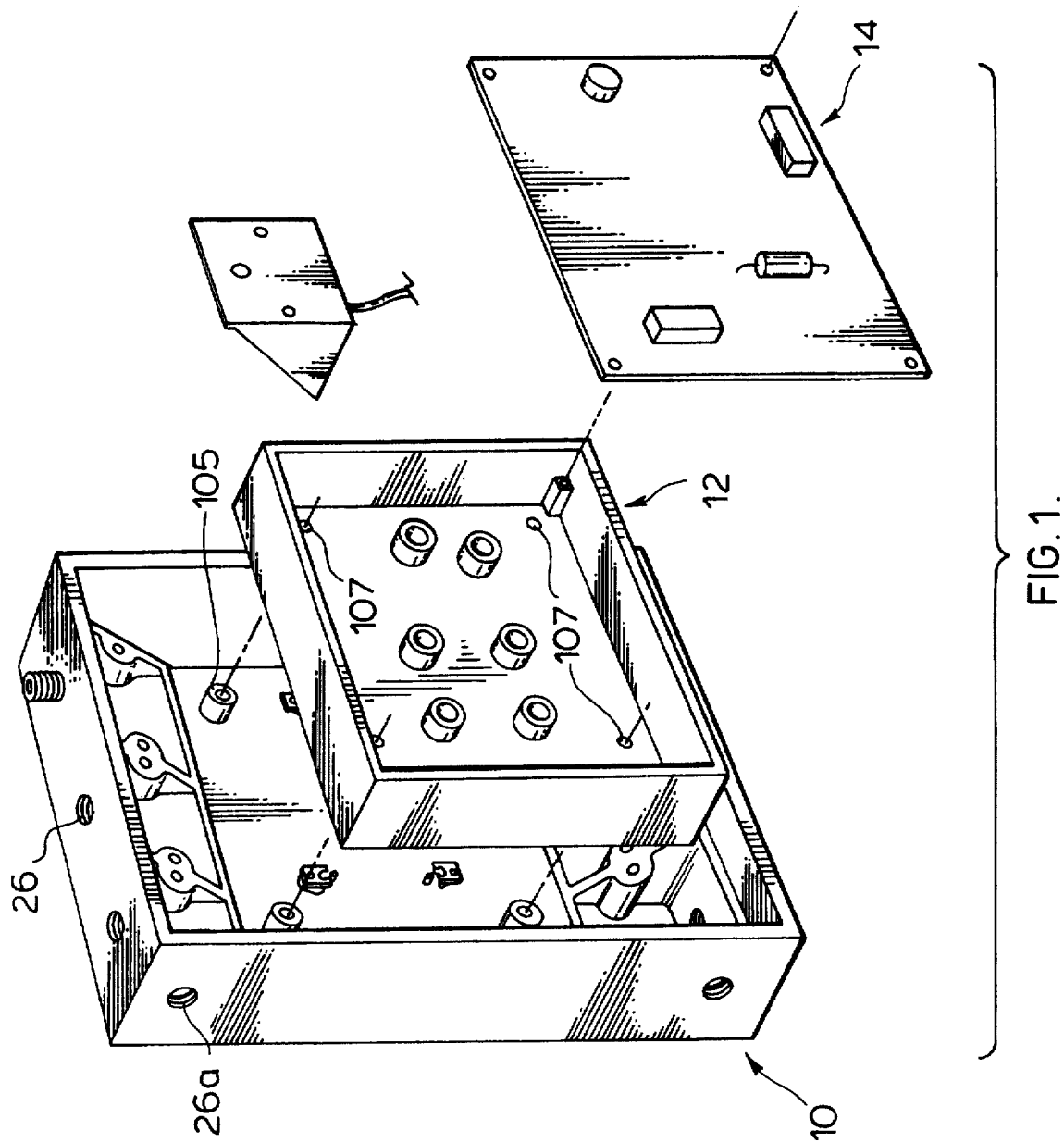

United States Patent [19]

Lynes et al.

[11] Patent Number: 5,545,847
[45] Date of Patent: Aug. 13, 1996

[54] AMPLIFIER HOUSING

[75] Inventors: Kenneth W. Lynes; Zdenek Nepovim, both of Lindsay, Canada

[73] Assignee: J. E.Thomas Specialties Limited, Lindsay, Canada

[21] Appl. No.: 935,202

[22] Filed: Aug. 26, 1992

[51] Int. Cl.[6] .................................................. H02G 3/08
[52] U.S. Cl. .............................. 174/52.1; 439/63; 439/65
[58] Field of Search .......................... 174/51, 52.1, 50, 174/59, 60, 36, 35 R, 35 C; 361/600, 736, 760; 439/1, 43, 44, 63, 65, 74, 76

[56] References Cited

U.S. PATENT DOCUMENTS

| | | | |
|---|---|---|---|
| 3,983,333 | 11/1976 | Cauldwell | 174/60 X |
| 4,370,516 | 1/1983 | Bailey, Jr. et al. | 174/59 |
| 4,507,627 | 3/1985 | Ito et al. | 174/52 R X |
| 4,816,612 | 3/1989 | Yeom | 174/52.1 X |
| 4,851,609 | 7/1989 | Reddy | 174/52.1 X |

Primary Examiner—Kristine L. Kincaid
Assistant Examiner—Christopher Horgan
Attorney, Agent, or Firm—Robert L. Westell

[57] ABSTRACT

A housing for a CATV circuit board has exterior cable pores and stations for connection to a circuit board. Flexible coaxial leads allow any port to be connected to selected one of a number of stations. The stations may be composed of a horizontal flexible lead and a vertical terminal for the circuit board. The position of the station may vary within a preset tolerance to facilitate connection to the circuit board. End sections may be provided at the ports and provided with means for separating or combining the RF and AC signals. A tray for seating in the housing and for receiving the circuit board may be shaped to ground the outer conductor from a station and forms also the ground for the circuit board.

22 Claims, 7 Drawing Sheets

AMPLIFIER HOUSING

This invention relates to a cable television housing and tray and amplifier, to features of such housing and tray and amplifier connections and to such features per se whether or not used with such housing.

In this application CATV means cable television.

In relation to a coaxial cable 'inner conductor' means the central conductor and 'outer conductor' means the outer conductor of the coaxial cable. In the applications dealt with by this invention the outer conductor is considered as ground and connected to the 'ground' of associated CATV circuitry and components; while the inner conductor carries the active signal, and carries it to and from the active portions of connected circuitry.

An amplifier housing is typically of generally rectilinear shape in plan view with a hinged cover. By 'bottom' in relation to such housing, in this application and claims herein, is the wall opposite the cover while the side and end walls are those, in rectilinear plan of shorter and longer length. However such terms do not imply any location in the housing in use where the bottom wall, for example, may be horizontal or in any of a number of vertical orientations.

Similiarly in the application and claims such directional indications as 'upper' and 'lower' 'upward' and 'downward' refer to a particular static attitude of a housing and are used for convenience of description only and do not imply a permanent or even usual orientation of the housing. Thus a direction described as 'upward' may, in the use of the housing be, horizontal, downward or, any other direction.

By 'port' is meant means for attachment of a coaxial cable to an external wall of an amplifier housing.

By 'external coaxial cable' is meant this cable carries radio and television frequencies (RF) and may or may not carry an electrical current (usually 30 to 60 VAC) needed to power the amplifier.

By 'aerial mount' is meant the way of mounting the amplifier, usually to a wire stretched between two telephone poles, also referred to as a horizontal mounting.

By 'pedestal mount' is meant where the external coaxial cable is underground, the amplifier is placed into a protective closure called a pedestal, placed usually above ground. The coaxial cable is brought from the ground into the pedestal, where it is connected to the amplifier, in most cases the amplifier has to be mounted in vertical position. This can be referred to as a vertical mounting.

By 'input port' is meant the port that receives RF from external coaxial cable.

By 'output port' is meant the port where an amplified RF signal leaves the amplifier on an external coaxial cable. There may be more than one output port.

By 'end section' is meant usually a self contained compartment within a housing. It consists of means to electrically connect the external coaxial cable to the tray (usually a screw type terminal on port side, and coaxial connectors on tray side). It may contain other components, such as circuit to separate AC current from RF signals, and means of circuit protection. Although referred to as an 'end' section the compartment may in fact be on the side of the housing within the scope of the invention.

By 'tray' is meant usually a chassis equipped with coaxial connectors to connect to end sections. It may contain the amplifier circuit board or provide connections to separate modules with components of the amplifier circuit, or combination of both.

'Active connection' is that connection which receives or delivers the signal which is amplified or otherwise processed by the circuit on the circuit board. The active connection will connect to the inner conductor of a coaxial cable.

Passive or ground connection is that connection to a circuit board which is associated with ground and the outer conductor of a coaxial cable.

In the prior art a CATV amplifier housing usually comprised a housing, with a hinged cover, a tray for mounting within the housing and a circuit board containing the amplifier and associated circuitry. The external coaxial cable provides an input to one of the ports while one or more ports are connected to exterior coaxial cable carrying the output or outputs. In such prior art housings, the active terminals of the circuit board are permanently associated with specific ports so that each port is dedicated has a specific character determined by the associated active terminal.

Considering only a single input and a single output port then it will be noted that these must each have a fixed location. With such prior art housing, on an aerial mount, to accomodate two horizontal directions of communication, the housing must be designed to be rotated about a vertical axis in which case the hinged lid in one orientation would frequently open toward an obstacle or support. If the amplifier is rotated about an axis perpendicular to its main plane then, in one orientation, the lid will open upwardly requiring an extra support to leave the maintenance man free to remove or repair the amplifier. The logic applies equally if there is more than one input or more than one output port. It will be obvious from the above that it would be much more convenient if the housing could be left in one orientation and the ports interchanged.

When the housing described above is used in a pedestal mount then usually one of the input or output ports will be at the top while the other will be at the bottom. With both (or all) external cables extending up from underground locations the external cable to an upwardly facing port requires a 180° bend. Such bend will usually either be too large for the pedestal mount enclosure or expensive fittings, which are time consuming to install will be required to provide the 180° external cable turn. It is also found that such fittings contribute to signal losses. Thus with the pedestal mount it is desireable that input and output ports could both be provided on the bottom of the amplifier housing.

This invention, in one of its aspects provides an arrangement where a plurality of coaxial first terminal locations are provided on the bottom of the housing each bearing predetermined spatial relationships to active connections on the amplifier circuit board (inner conductor) or ground connection on the tray (outer conductor) where the circuit board circuit will also be grounded. A plurality of ports are provided preferably on the ends of the housing to any of which plurality an exterior coaxial cable may be connected, as desired. A second terminal means, preferably in the form of an end section is located and preferably selectively mountable at a plurality of such ports each with a flexible coaxial cable of a length to connect to as many first terminal points as desired. Thus an external cable carrying an input or output signal may be connected to a selected one of a plurality of ports and whichever port is selected the flexible coaxial cable from its second terminal means may be connected to the first terminal means whose location corresponds to the desired active terminal of the circuit board to be connected to the external cable. Thus any change of orientation of the housing or reversal of its function may be accompanied by a change of exterior cable connections to allow exterior cable connection to the ports most suitable for the exterior cables in that orientation, with, corresponding alteration of the flexible coaxial cable connections to each first terminal location.

It is within the broad scope of the invention that each second terminal means may be fixed in position relative to a port, so that, in this variant the desired flexibility of connection between a port and a selected one of a plurality of first terminal locations is achieved solely by the flexible coaxial cables and movable first terminal means. In such arrangement the 'end sections' for the second terminal means may be moulded as part of the housing.

In a preferred aspect of the invention the second terminal means are permanently connected to the flexible coaxial cables.

Preferably the second terminal means are each associated with a removable mount, called herein an end section, which is detachably attachable at a selected plurality of selected ports.

It is however, within the scope of the invention, to provide removable attachment of the flexible coaxial cables to the second terminal means at the ports whereby movement of the flexible coaxial cable means may, if desired, be moved from one second terminal means to another without moving the second terminal means from port to port.

Preferably the first terminal means comprises upwardly extending inner and outer coaxial conductors for connection respectively to an active circuit terminal on the amplifier circuit board and to a grounding point for the circuit (usually the metal tray). To facilitate the registration of the upwardly extending conductors with the respective amplifier circuit board active terminal and with the tray, the mounting means for upwardly extending conductors is designed to allow them to move freely (as a unit) over a predetermined distance in any azimuthal direction. Preferably there is a bevel on the upwardly extending outer conductor which may act to guide the upwardly extending conductors into the desired connections.

The inventive features described in the preceeding paragraph are preferably combined with the flexible coaxial cable and with the provision of a right angled connector at the base of the upwardly extending conductor which allows the flexible coaxial cable to lie generally parallel to the bottom (taking up very little vertical space) and the inner and outer conductors to extend upwardly therefrom.

In a preferred version of an aspect of the invention the tray which is in registration with the amplifier circuit board is (as is almost universally the case) of metal and is shaped to receive in sliding contact, the outer conductor of the first terminal means. To this metal tray will be connected the grounding lead or leads from the amplifier circuitry. Thus the necessary grounding connection for the circuit board is made when the tray is installed over the outer bottom conductor.

In a preferred aspect of the invention, one of the end sections connects to an external cable carrying an input signal at a port. A filter usually associated with the second terminal means is connected to receive the signal from the port and separate it into RF and A.C. components.

A number of options exist with the end section producing the split components. The A.C. components may be connected in one or more A.C. circuits. The connection of any port to an A.C. circuit may be controlled by a detachable connection between the individual A.C. lead and the remainer of the A.C. circuit or circuits. A fuse may also be inserted in the A.C. lead to protect circuitry connected thereto.

Where second terminal means includes a lead connectable to an A.C. circuit or circuits, the presence or absence of a fuse jumper or power director may be used to determine the connection of the A.C. lead to other A.C. circuitry.

Other features and advantages of the invention will be described in connection with the preferred embodiment which follows.

Figure 2:
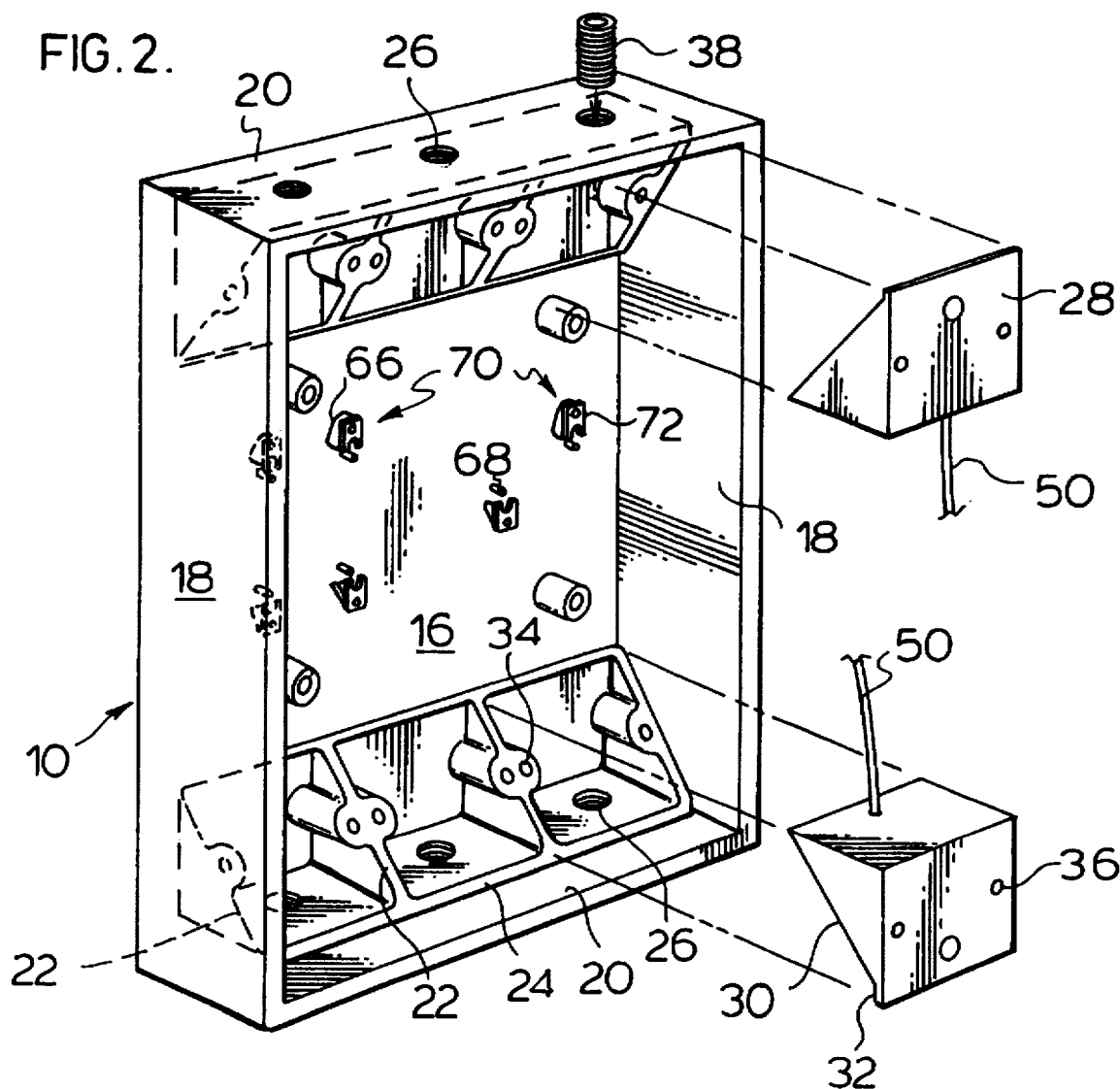
Figure 3:
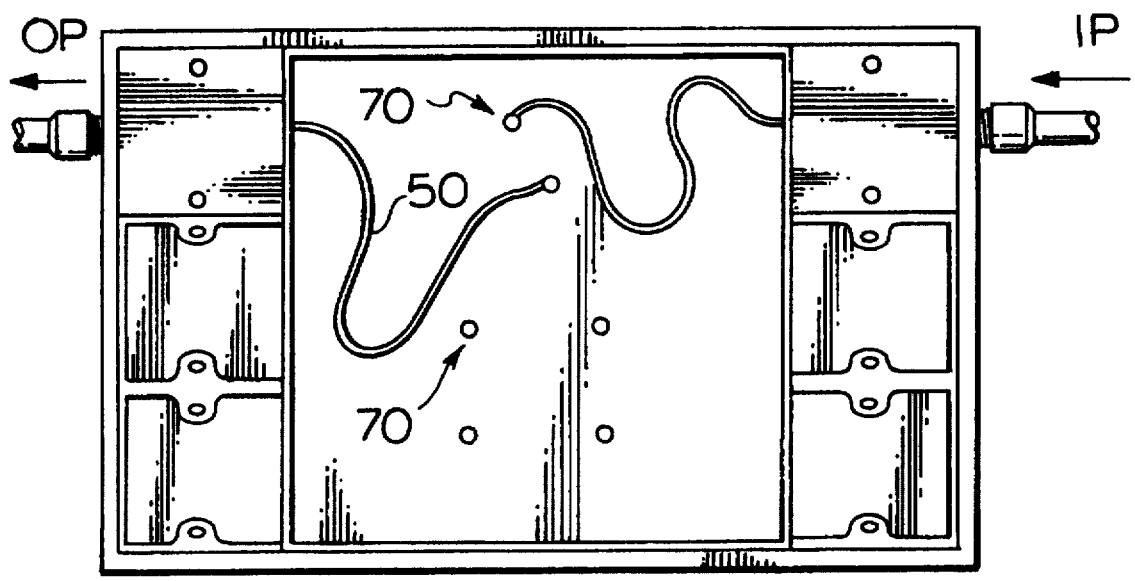
Figure 4:
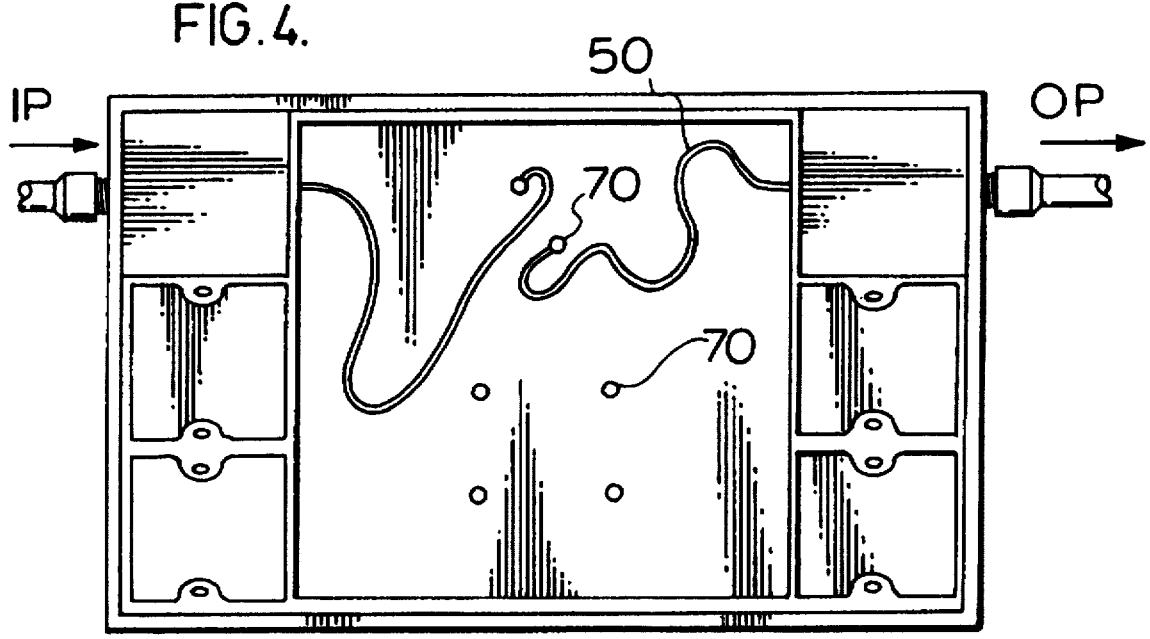
Figure 5:
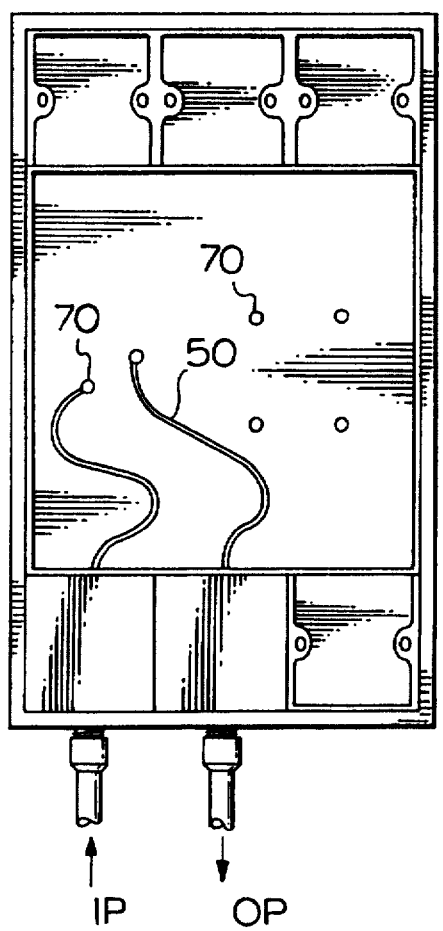
Figure 6:
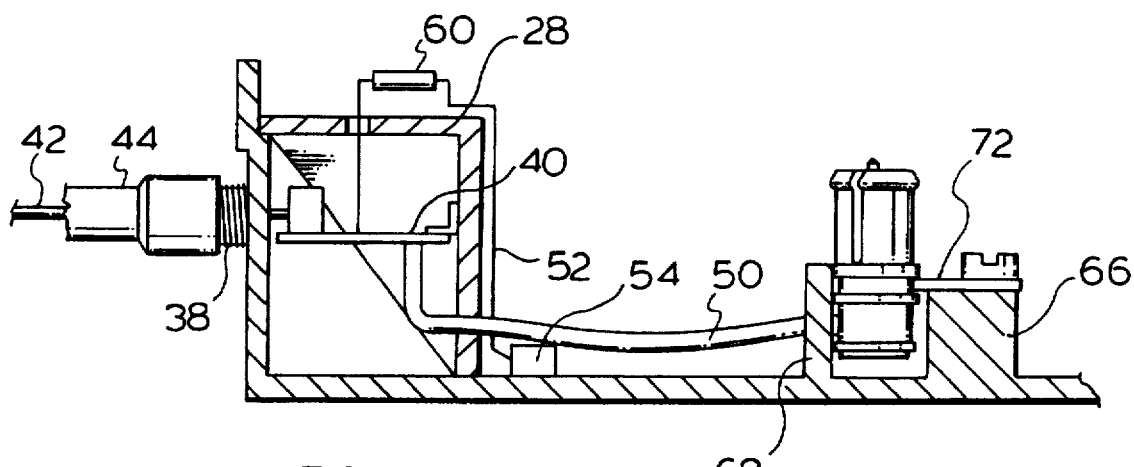
Figure 7:
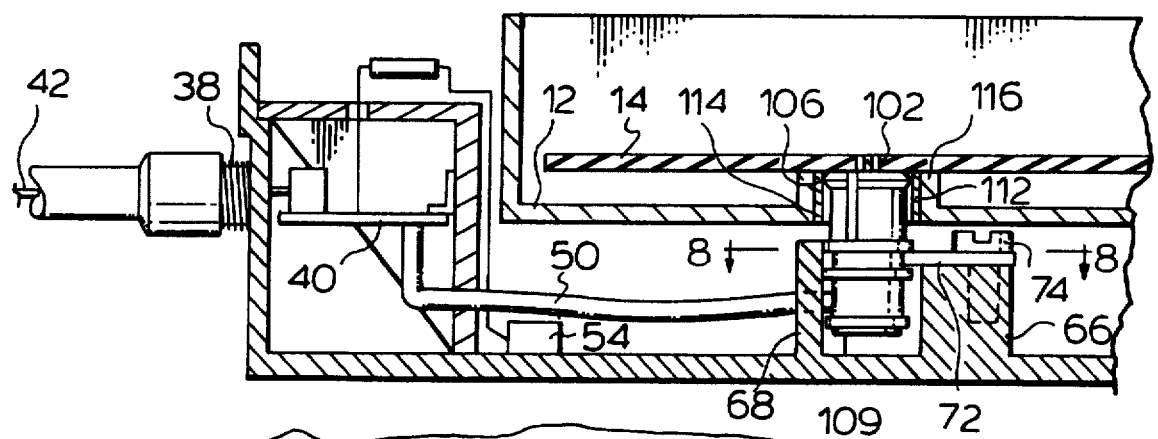
Figure 8:
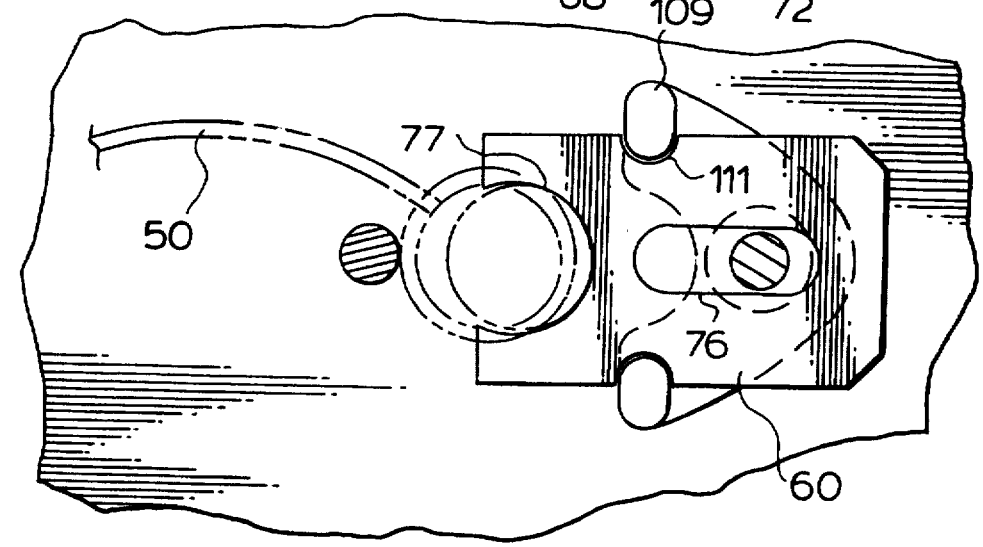
Figure 9:
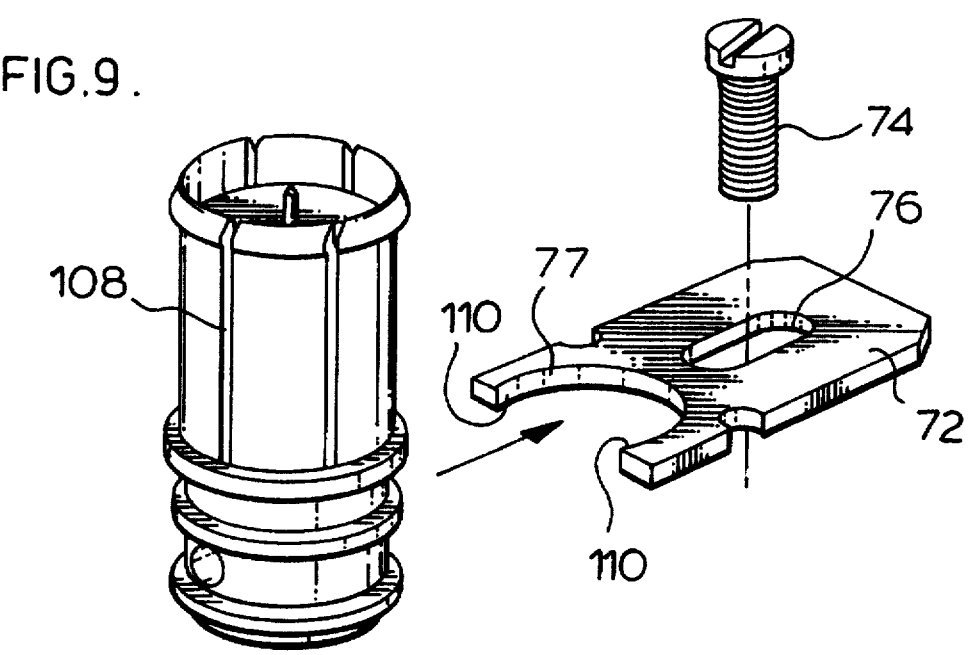
Figure 10:
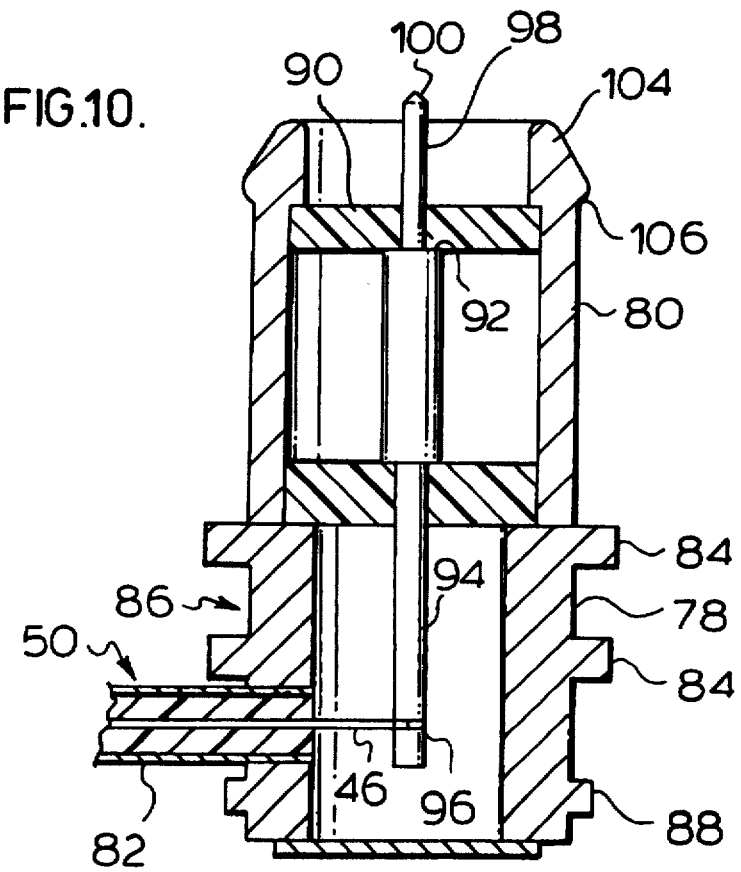
Figure 11:
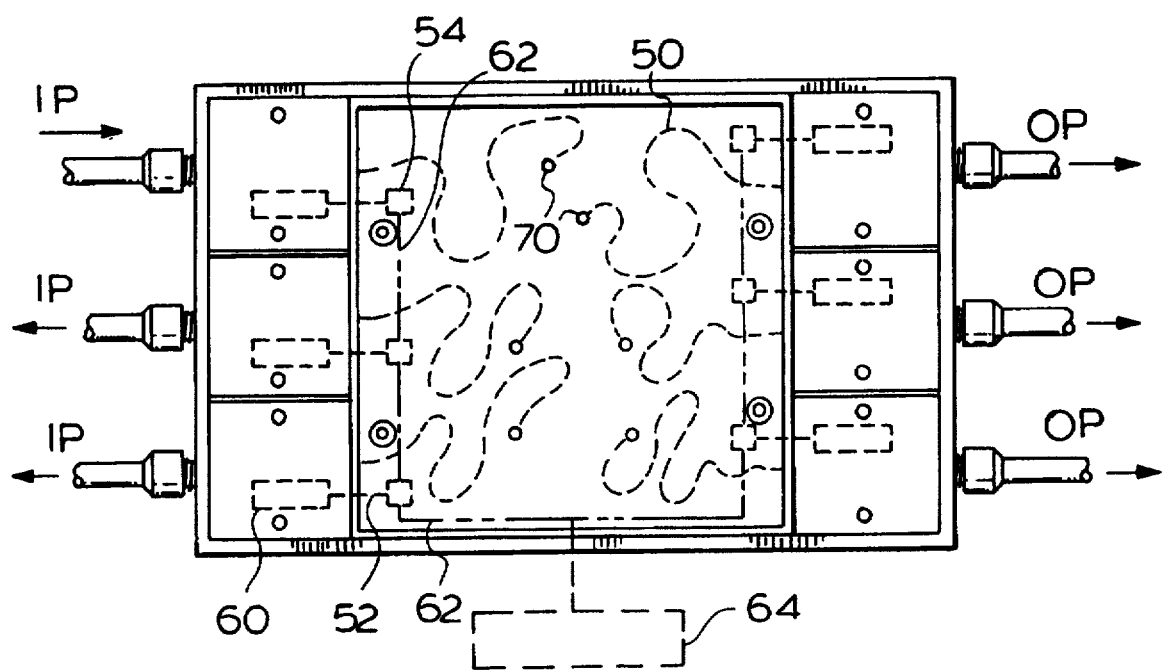

In drawings which illustrate a preferred embodiment of the invention:

FIG. 1 is a schematic, exploded, perspective view showing the relationship of a housing, a tray and a circuit board, with the housing cover removed, FIG. 2 is a perspective view of a housing, with the housing cover removed, FIGS. 3–5 are schematic views showing the flexibility of housing connections for various exterior cable arrangements, FIG. 6 is a side view partially in section demonstrating the connection of an end section and upstanding terminal means for connection to the first circuit board, FIG. 7 is a side view, partly in section, showing the connection of the terminal means of FIG. 6 to a tray, FIG. 8 is a plan view demonstrating the 'floating' capability of the first terminal means, FIG. 9 is a perspective view of a portion of the first terminal means, and FIG. 10 is a vertical section demonstrating the construction of the first terminal means, FIG. 11 is a schematic view showing the relationship of the AC connections.

In FIG. 1 is demonstrated in exploded view the relationship of the housing 10, to which the tray 12 is attached and the circuit board 14 which is mounted in the tray. The details of detachably bolting the tray to the housing and detachably bolting the circuit board to the tray are well known to those skilled in the art. The tray may, in some applications, be replaced by a number of trays dimensioned to fit within a housing such as that shown and each tray may carry a circuit board or other device. The cover, and many details of the housing are omitted as well known to those skilled in the art. However it may be of interest to note that the cover would normally be bottom hinged in FIGS. 3 and 4, and hinged on a side in the orientation of FIG. 5. In both above orientations the cover will stay open by gravity or friction while the technician works.

In FIG. 2 is shown a housing 10 having a bottom 16, side walls 18 and end walls 20. As shown, in the preferred embodiment each end wall 20 has supports 22 extending diagonally from the bottom, inward of the end walls to a location on the end wall near its upper edge. Supporting surface 24 joins the upper ends of supports 22. As indicated the supports 22 divide space adjacent the end walls into the sub-locations at each end, each sub-space corresponding to a port. An aperture 26 is provided in each end wall corresponding to each port and each end section, to be described. End sections 28 provide: a diagonal surface 30 to rest on support surface 22, a vertical surface 32 to seat on support surface 24 and vertical, horizontal and diagonal walls, to form with the housing and supports 22 a protected enclosure for the second terminal means at each port. With the form of the end sections shown, or with end sections of other form, conducting wire mesh may be placed between end section and housing surfaces. Threaded wells 34 in supports 22 receive bolts passing through apertures 36 to detachably attach the end sections to the housing.

(Although the preferred end sections are as shown, any suitable end section may be used within the scope of the invention). It is within the scope of the invention to place the 'end' sections along the 'side' or longer dimension of the housing. For example the sloping supports might be omitted and the present end section walls made rectangular to provide four sides which with the relevant portions of the housing side and end walls will form a rectilinear six walled or multi-walled enclosure. Alternatively the detachable end section may be merely a cover while the other walls are integral with the housing.

As shown each end wall aperture in the housing wall may be provided with an outwardly directed threaded electrically conducting nipple 38 of conventional form to which the outer conductor of a conventional coaxial cable may be attached, by means of a standard coaxial connector.

The end section is shown only schematically but supports a section circuit board 40 which in turn at one of its active terminals has a terminal arranged to be in conducting relationship with the central terminal 42 of the exterior coaxial cable 44. Another active terminal of the section circuit board is connected preferably by a solder joint to the inner conductor 46 (see FIG. 10) of a flexible coaxial cable 50.

The 'section' circuit board 40 is so called to distinguish it from the main circuit board 14 contained in the tray 12. The 'flexible' coaxial cable is so called to distinguish it from the exterior coaxial cables.

The details of the section circuit board 40 are not shown as these can vary widely and are well known to those skilled in the art. However it should be noted that the section circuit board 40 will provide a direct or indirect connection (not shown) between the inner conductor 42 of the exterior coaxial cable and the inner conductor 46 of the flexible cable 50. Such connection will carry input signals from an exterior coaxial cable to the main circuit board 14 or output signals in the opposite direction. Some components of the signal may change in the transit of the section circuit board 40. Most commonly an input signal may be filtered on the section circuit board 40 to separate it into AC and RF components. For example in FIG. 6 the section circuit board has a filter 60, to separate the RF and AC components. The RF component is sent to the inner conductor 46 of the flexible coaxial cable 50. The AC component is provided along line 52 to AC terminal 54. Conversely where the section circuit board contains a combiner the AC circuit may be recombined with the RF signal.

FIG. 11 shows an AC circuit which is by way of example only. FIG. 11 shows a housing 10 with one input port IP and five output ports OP. Connections 50 to first terminal means at locations 70 are for background only. Each section AC lead 52 is connected to its AC terminal 54. In practice the simplest manner of connecting, or not, the AC from or to a section circuit board is the insertion or removal of a fuse such as fuse 60 in line 52. The AC circuit, including elements 52,54,62 is shaped and located to be housed in the space between the housing bottom and the tray bottom when the latter is resting on the housing. The tray bottom may be supported on and spaced from the bottom of the housing in any desired manner, such as by supports 105 moulded integral with the housing and bored to receive bolts through tray apertures 107. It will be noted that the support must (as here) provide proper alignment of the tray with the housing. The A.C. circuit is omitted from FIGS. 1, 2, and other figures for clarity of explanation of ire features shown in the latter figures.

In the Example of FIG. 11 a combined AC and RF signal is received along the inner conductor of exterior cable 44 at port IP which is here used as the RF input port. The other five ports are RF output ports. Components on the circuit board separate the AC from the RF signal. The AC signal at one of the ports goes to its AC terminal-54 which is connected by leads 62 to the remaining circuit AC terminals 54. The AC circuit is connected to a power supply 64. The power supply which is not shown other than schematically may be housed in any convenient part of the housing. At the power supply 64, the AC is converted to DC for supply (by connections not shown) to any required locations within the housing.

The AC input port may be the same as or different from that receiving the RF input. At the end section 28 receiving the AC, the input AC is split from the RF at the section circuit board. It is provided through the AC leads 52, 62 to the section circuit boards at the remaining ports, where it is combined with the RF at the respective end section circuit board for transmission along the corresponding exterior coaxial leads. At the power supply 64 the AC current is received and converted to DC for operation of the amplifier over DC connections, not shown. Disconnection and connection of an AC terminal may be achieved by removal and insertion, respectively of fuses 60.

The exterior of the flexible cable 50, (see FIG. 10) is its outer conductor so it is grounded where it passes through the conducting end section and the ground connection is made by the end section to the housing.

The components of the end section 28 which couple the inner conductor 42 of the exterior cable to the inner conductor 46 of the flexible cable and the ground connection from the outer conductor of the exterior coaxial cable to the outer conductor of the flexible cable are collectively called the second terminal means in the specification and claims herein. Although it is preferred to attach the flexible coaxial cable permanently both physically and electrically to the second terminal means, such connection could be made detachably attachable if desired. As previously discussed the second terminal means may be fixed in housing position so the flexibility is solely provided by the flexible leads and the movable first terminal locations.

As shown the six end section positions have central port apertures 26 so that each end section may be selectively mounted in any of the positions. Sometimes it may be found desirable to arrange the apertures 26 so that the exterior cables may be placed nearer to the housing corners. Thus with the corner port positions to the left of FIG. 2 the aperture would be moved toward the left in the figure and in the right corner port positions, moved to the right. Two types, 'right' and 'left', end sections would be , provided. The middle aperture ports will then each be placed to one side or the other of the position shown to have the one or the other type assymetry to avoid the necessity of having 3 kinds of end sections. However there will, in such arrangement be two kinds of end sections so that a 'right' and 'left' handed end section will only couple, respectively, to 'right' and 'left' handed ports.

In FIGS. 6, 7 and 9 is shown the mounting for the first terminal means. The housing provides at each of the positions 70 shown(being the first terminal locations) of FIG. 2 a mounting post 66 and a stop post 68. The mounting post is hollowed to be concave toward the stop post and acts to receive an upstanding coaxial connector, as shown. Detachably connected to the top of the mounting post is clamp plate 72 which is slotted to allow passage of mounting bolt 74 (which mates with a threaded bore in post 66) to fix it in place. The clamp slot 76 allows movement of the plate toward and away from the stop post when the bolt is loosened. The clamp plate is provided with a circular cavity edge 77 and preferably encompasses about 240° and the clamp plate is designed so that the latter cavity may face the stop post when fixed in position.

Raised bosses 109 on the upper surface of post 66 rest in recesses 111 of the clamp plate to maintain the alignment of the latter when bolt 74 is tightened.

The end of the flexible coaxial cable 50 remote from the end section and from the second terminal means is provided with a right-angled connector to transform the generally horizontal or transverse attitude of the flexible cable 50 into a vertical connection for the tray 12 and circuit board 14. FIG. 10 shows such connector in section. As FIG. 9 and 10 show, the connector has an outer sleeve with a lower conducting portion 78 and an upper conducting portion 80 which are both surfaces of revolution. The lower sleeve is provided with a radial bore into which is permanently fixed the outer conductor 82 of the flexible coaxial cable 50. The lower sleeve is also provided with a pair of vertically spaced ridges 84 which define between them an outwardly facing groove 86 which will slidably receive the thickness of the clamp plate at concavity 77. The difference in radius between edge 77 and groove 86 of the clamp allows the connector to move in all azimuthal directions with a predetermined excursion from a neutral or median position. Stop post 68 limits the excursion for connector movement in its direction. Ridge 84 or ridge 88 contacts stop post 68 at approximately the same excursion from the neutral position as permitted in other directions by the clamp plate concavity. As shown in FIG. 10 the upper sleeve has a pair of insulation spacers 90 which bear upwardly and downwardly, respectively on the shoulders 92 formed by a thickened portion of a central conductor 94 which has a thinner extension, extending downwardly with a small bore 96 of the end of inner conductor 46 of flexible cable 50 which may be fixed in place by soldering. A thinner upper extremity 98 of the terminal inner conductor and is provided with an upwardly tapering end 100 for connection to the active terminal 102 of a circuit board.

The connection to the circuit board to the conductor 46, and the design of the circuit board to achieve this forms no part of the present invention and may be accomplished by a variety of conventional means. In the preferred embodiment, the outer surface of the connector is provided at its upper end with a downwardly and outwardly sloping surface 104 to an outwardly facing bulge 106. As best shown in FIG. 9 the upper end of the upper conductor is provided with a plurality (here four) downward cuts 108 to render the material between the cuts slightly flexible.

The clamp plate 72 and its slot 76 are designed so that, when the bolt 74 is loosened, and the plate slid away from the clamp post 68 the upper and lower portions of the sleeve may be moved into or out of position between cavity edge 77 and the stop post.

The clamp plate 72 is slid into position with its concavity receiving the lower sleeve 78, in the material forming the groove 86 between ridges 84. Preferably the concavity of the clamp plate is dimensioned so the spacing of tips 110 of the clamp plate is slightly larger than the diameter of groove 86. When the plate is moved through the excursion allowed by the slot, toward the stop post, the sleeve is maintained in position with the tolerance of movement allowed by the larger circumference of the edge 77 of the clamp plate, in most axial directions, and with approximately the same tolerance in directions toward the stop plate and as limited by it.

The tray 12 is provided with apertures 112 slightly smaller than the bulge 106 of the outer conductor of the first terminal with upstanding walls 80.

Thus the sleeve may be conductingly coupled to the conducting tray as the tray is moved downwardly with its aperture 112 sliding about the upper sleeve portion 80. As such downward movement is continued, chamfered walls 104 of the upper sleeve portion are forced inwardly to allow passing of the sleeve until the bulge 106 in the sleeve engages with the upstanding walls of the tray. As stated the upper sleeve portion 80 may make mechanical and electrical connection with the material of the tray itself in this way. However it is preferred to enlarge the tray apertures somewhat, as shown, and line each aperture with a bushing 112, whose inner surface makes mechanical and electrical connection with the bulge 106 as described.

Thus the first terminal means comprise the sleeve 78 and the accompanying inner conductor 98, 100 so that the inner conductor is adapted for connection to an active terminal of the circuit board and sleeve 78 is adapted for connection to ground which will also be ground for circuits of the circuit board.

The circuit board will be provided with active terminals 102 not shown in detail, to receive the upwardly projecting inner conductor in registration when the outer conductor is coupled to the sleeve. The floating mount for the first terminal means (sleeve portions 80 and 78) allows the first terminal to shift in any azimuthal direction to reach mating relationship with the tray apertures 112. This is a very great advantage and saves time in assembly and avoids the expense and delay of what would otherwise be too high precision requirements in the tray and circuit board manufacture of the same time that sleeve portion 80 contacts a bushing 112, inner conductor 100, 98 is in position to contact the active terminal 102. The circuit board may have from two up to any number of active terminals that space in the housing will permit. In the examples shown it may have up to six. For each of such active terminals the first terminal means will be provided as described.

In use then an amplifier housing is provided and ports are chosen to provide the most convenient arrangement of the exterior cables to be connected thereto. The exterior cables are connected. End sections are then mounted on the housing at the selected ports. The AC connections as needed are made in the housing below the position for the tray. The end sections will each have a flexible lead and a first terminal sleeve connected thereto. The flexible coaxial cable must in each case be long enough to reach the first terminal location 70 selected. The first terminal sleeve is then mounted at the selected first terminal location which corresponds to that active terminal of the circuit board which is to be connected to the exterior cable corresponding to the port where the attached end section at the other end of flexible cable 50 is mounted. With the first terminal sleeves in place and the clamp plates 72 tightened, the tray, with the circuit board attached, is then fitted into place (and has registration means with the housing). As the tray is fitted in place, the floating mounts for each first terminal sleeve allows azimuthal movement of the first terminal sleeve to completely align with the tray apertures so that the first sleeve will move into the tray apertures, aided by the chamfered surface 104 on the top of the sleeve. The tray is lowered into place until it rests on to housing supports examplified by 105 to be fastened in place by bolts 109 at suitable spacing from the housing bottom, at which point the sleeve bulge 106 engages with the upstanding walls 116 or the bushing. The inner conductors 98, 100 of the first terminal sleeve are then in contact with the active circuit board terminals 102. Disassembly, for maintenance or repair involves a reversal of the above procedure. With tray and circuit board removed, the port connection of the exterior cables may be altered. A corresponding change may be made by connecting an end section at the new port to the proper first terminal location by loosening the clamp plate at the first terminal location to allow a change of first sleeves. In some cases the connection at the first terminal station may be left in place and the end section moved to conform to the change of position of the exterior cable to be connected to that first terminal desired port for connection to particular active terminal.

Although it is customary to design a housing so that the end sections and ports are located at the shorter end walls of the housing, such end sections or ports may, if desired be located on the longer side walls if desired.

I claim:

1. Conducting housing containing CATV circuit board, said housing defining at least two ports, said CATV circuit board having at least two active circuit board terminals and a passive connection, means for connecting an exterior coaxial cable having exterior inner and exterior outer conductors to each of said ports, a first housing terminal location corresponding to each said active circuit board terminal, a second housing terminal location corresponding to each said port location, at least two flexible coaxial cables each having a flexible inner conductor and a flexible outer conductor, each said flexible coaxial cable terminating at one end in means electrically connecting its said inner flexible conductor to one of said active circuit terminals at one of said first housing terminal locations and in means electrically connecting its flexible outer conductor to said passive connection, each said flexible coaxial cable terminating at the other end in means for electrically connecting its flexible inner conductor to an exterior inner conductor associated with one of said ports at a second housing terminal location and means for electrically connecting its flexible outer conductor to the exterior outer conductor associated with the same port, said flexible coaxial cables being of a length to connect a first terminal location to either of two said port locations, whereby each said flexible outer conductor acts to provide shielding from the signals emanating from other said flexible coaxial cables.

2. A conducting housing as claimed in claim 1 where each said flexible cable is connected permanently to one of said second terminal locations.

3. Conducting housing as claimed in claim 1 wherein said housing is configured to provide a plurality of said port locations and wherein each said coaxial cable other end is connected to an exterior cable at any selected one of said plurality of port locations.

4. Conducting housing as claimed in claim 2 wherein said housing is configured to provide a plurality of said port locations and wherein each said coaxial cable other end is connected to an exterior cable at any selected one of said plurality of port locations.

5. A conducting housing as claimed in claim 1 where each said first housing terminal locations is in combination with and mountable on the bottom of said housing and has upwardly directed location inner and location outer coaxial conductors, clamp and guide means for securing said one end of said flexible coaxial cable to said bottom, said clamp and guide means being adapted to allow a predetermined amount of movement in any direction along said bottom when so secured, and where said first housing terminal locations are adapted to provide connection between the flexible inner and flexible outer conductors of the flexible coaxial cable and, respectively, the upwardly directed location inner and location outer conductors.

6. A conducting housing as claimed in claim 2 where each said first housing terminal locations is in combination with and mountable on the bottom of said housing and has upwardly directed location inner and location outer coaxial conductors, clamp and guide means for securing said one end of said flexible coaxial cable to said bottom, said clamp and guide means being adapted to allow a predetermined amount of movement in any direction along said bottom when so secured, and where said first housing terminal locations are adapted to provide connection between the flexible inner and flexible outer conductors of the flexible coaxial cable and, respectively, the upwardly directed location inner and location outer conductors.

7. A conducting housing as claimed in claim 3 where each said first housing terminal locations is in combination with and mountable on the bottom of said housing and has upwardly directed location inner and location outer coaxial conductors, clamp and guide means for securing said one end of said flexible coaxial cable to said bottom, said clamp and guide means being adapted to allow a predetermined amount of movement in any direction along said bottom when so secured, and where said first housing terminal locations are adapted to provide connection between the flexible inner and flexible outer conductors of the flexible coaxial cable and, respectively, the upwardly directed location inner and location outer conductors.

8. A conducting housing as claimed in claim 5 wherein each said clamp and guide means is adapted to allow attachment and release of said flexible coaxial cable.

9. Conducting housing as claimed in claim 1 wherein each said second housing terminal location is mounted in an end section, said housing includes side and end walls, said housing along at least one of said end walls providing a plurality of alternate mounts for said end section.

10. Conducting housing as claimed in claim 2 wherein each said second housing terminal location is mounted on an end section, said housing includes side and end walls, said housing along at least one of said end walls providing alternate mounts for said end section.

11. A combination comprising:

a coaxial connector which includes inner and outer coaxial conductors in fixed relationship to each other, and defining an extension direction, said inner conductor being shaped for connection to the active terminal of a circuit board, said outer conductor being shaped for connection to a grounding terminal, means for retaining said connector on a base surface with said inner and outer coaxial conductors and said extension direction extending upwardly therefrom, said retaining means allowing movement of said connector perpendicular to said direction over a small area.

12. A combination as claimed in claim 11, wherein said connector is adapted to connect said inner and outer conductors, respectively to the inner and outer conductors of a coaxial cable which extends parallel to said base surface.

13. A combination as claimed in claim 12 wherein said coaxial cable is flexible.

14. A combination as claimed in claim 13 wherein a clamp and guide means is adapted to allow attachment and release of said connector.

15. Coaxial connector and mount wherein the connector has an upwardly directed outer and inner conductor and a laterally directed inner and outer conductor, means respectively connecting the inner and the outer conductors to each other, a detachable clamp defining a laterally open slot defined by edges to receive said upwardly directed outer conductor, a stop located to prevent movement of said connector laterally out of said slot, said edges and a post allowing a predetermined lateral movement in any azimuthal direction of said connector relative to said clamp from a central position, cooperating means on said clamp and said upwardly directed outer conductor preventing removal of said connector with said clamp in position.

16. Housing for a CATV amplifier defining opposed side walls and opposed end walls, said housing being electrically conducting, an exterior coaxial cable located exterior to said housing having an exterior inner and an exterior outer conductor, an interior inner conductor inside said housing, said end walls, or side walls define a plurality of ports with means to connect the exterior outer conductor to said housing; said housing, defining an aperture to allow the connection of the exterior inner conductor to said interior inner conductor, end sections for location inside said housing, cooperating means on said housing, and each said end section, permitting mounting of one of said end sections interior of said housing, at a location opposite a selected one of said plurality of ports, means forming part of one of said end sections and insulated from said housing for connection to said exterior inner conductor, said one of said end sections including a filter circuit connected to receive the signal from said exterior inner conductor for providing RF signals to an RF path and A.C. power signals to an A.C. lead.

17. A conducting housing as claimed in claim 16 wherein said A.C. lead is selectively connectable to an A.C. lead of another end section.

18. A conducting housing as claimed in claim 16 where a fuse is connected in said A.C. lead.

19. A conducting housing as claimed in claim 18 where said A.C. lead is connectable to an A.C. lead of another end section and said fuse is selectively removable to allow selective connection to another A.C. lead.

20. Housing for cable TV circuit boards having bottom, top, and side walls, said housing being electrically conducting, an electrically conducting tray chassis detachably mounted in a predetermined position in said housing, a circuit board detachably mounted on said tray in a predetermined position, at least one active connection on said circuit board, a coaxial connector mountable on the bottom of said housing in a predetermined position relative to said tray, with upwardly directed outer and inner conductors, aperture in the bottom of said tray adapted when said tray is mounted on said housing, to receive said outer coaxial conductor in conducting relationship, a terminal on said circuit board located to receive said upwardly directed inner conductor when said tray aperture receives said outer conductor.

21. Housing as claimed in claim 20 wherein there are provided clamp and guide means for said coaxial terminal securing said coaxial connector to the bottom of said housing, adapted to allow a predetermined amount of horizontal movement of said connector.

22. Housing as claimed in claim 21 wherein at least one of said upwardly directed outer conductor and an edge of said tray defining said aperture, being provided with bevel means adapted to guide said upwardly directed outer conductor into said aperture.

\* \* \* \* \*